United States Patent
Wu et al.

(10) Patent No.: US 8,258,192 B2
(45) Date of Patent: Sep. 4, 2012

(54) SILICONE COMPOSITION EMULSION AND METHOD FOR PREPARING THE SAME

(75) Inventors: Fei Wu, Nanjing (CN); Zhiping Cao, Nanjing (CN); Xiang Zhong, Nanjing (CN); Yong Xu, Nanjing (CN)

(73) Assignee: Zhiping Cao, Nanjing (CN)

( * ) Notice: Subject to any disclaimer, the term of this patent is extended or adjusted under 35 U.S.C. 154(b) by 176 days.

(21) Appl. No.: 12/733,905

(22) PCT Filed: Aug. 10, 2009

(86) PCT No.: PCT/CN2009/000908
§ 371 (c)(1),
(2), (4) Date: Apr. 16, 2010

(87) PCT Pub. No.: WO2010/025618
PCT Pub. Date: Mar. 11, 2010

(65) Prior Publication Data
US 2010/0249275 A1    Sep. 30, 2010

(30) Foreign Application Priority Data
Sep. 2, 2008  (CN) .......................... 2008 1 0124771

(51) Int. Cl.
*C08G 77/06*    (2006.01)
(52) U.S. Cl. ........................................................ 516/55
(58) Field of Classification Search .................... 516/55
See application file for complete search history.

(56) References Cited

U.S. PATENT DOCUMENTS

| 4,639,489 A | 1/1987 | Aizawa et al. |
| 4,853,474 A | 8/1989 | Bahr et al. |
| 5,451,692 A | 9/1995 | Raleigh et al. |
| 5,895,794 A | 4/1999 | Berg et al. |
| 5,973,066 A | 10/1999 | Sakuta et al. |
| 6,001,887 A | 12/1999 | Keup et al. |
| 6,395,790 B1 | 5/2002 | Creutz et al. |
| 6,737,444 B1 * | 5/2004 | Liu .................................. 516/55 |
| 7,566,750 B2 | 7/2009 | Rautschek et al. |

FOREIGN PATENT DOCUMENTS

| CN | 1807512 A | 7/2006 |
| CN | 101348571 A | 1/2009 |
| EP | 0 163 541 A2 | 12/1985 |
| WO | WO 2008/045427 A1 | 4/2008 |

OTHER PUBLICATIONS

International Search Report issued on Nov. 19, 2009 in International Application No. PCT/CN2009/000908 (with translation).

* cited by examiner

*Primary Examiner* — Kuo-Liang Peng
(74) *Attorney, Agent, or Firm* — Oliff & Berridge, PLC

(57) ABSTRACT

A silicone composition emulsion and a method for preparing the same are provided. The method is characterized in that a low-molecular-weight polysiloxane and an emulsifier are added into a high-viscosity silicone composition. The low-molecular-weight polysiloxane has a viscosity of 5-3,000 mPa·s, and the emulsifier is an nonionic surfactant. The amount of the low-molecular-weight polysiloxane is 5-50 parts and the amount of the emulsifier is 40-150 parts, based on 100 parts of the high-viscosity silicone composition.

5 Claims, No Drawings

SILICONE COMPOSITION EMULSION AND METHOD FOR PREPARING THE SAME

BACKGROUND OF THE INVENTION

1. Field of Invention

The present invention relates to a silicone composition emulsion and a method for preparing the same, and more particularly, to a method for improving the stability of a high-viscosity silicone composition emulsion dispersion, which is related to the preparation of fine chemical additives, and is in the field of fine chemical preparation technology.

2. Related Art

The silicone dispersion, i.e., emulsion, has very wide application range, and is applicable in textile finishing agents, fabric softeners, antiperspirants, defoamers, release agents, and so on. The high-viscosity polysiloxane is an important component in shampoos. The composition of white carbon black and high-viscosity polysiloxane has important application in sealing, lubrication, insulation, anti-corrosion protection, and it also has excellent anti-foaming performance in foam control.

The silicone emulsion is mainly divided into two types, that is, water in oil (W/O) and oil in water (O/W). The silicone emulsion used in the fields of textiles and cosmetics is substantially the O/W type. The preparation of the O/W type silicone emulsion mainly includes two methods: the first one is a polymerization method, that is, silicone monomers are polymerized in the presence of a catalyst, an initiator, and a surfactant, for example, for hydroxyl silicone oil emulsion, and the second one is a mechanical method, that is, components for preparing the emulsion, including oil-phase component, emulsifier, water, stabilizer, are dispersed through heating and stirring, mechanical shearing, colloid milling, homogenization.

It is difficult to emulsify and disperse a high-viscosity silicone composition into water, which is described in Patent CN1807512. The functions of the silicone emulsion are related to many properties of the emulsion itself, for example, temperature stability, shear resistance, dilution stability, and storage stability of the emulsion, and in U.S. Pat. No. 6,001,887, methods for testing the stability of the emulsion are reported. As for defoamers, if a silicone defoamer emulsion having poor stability is used in dyeing of cotton and chemical fibers to eliminate harmful foams, "silicone spots" will be formed on the cloth, thus the efficiency of dyeing and the quality of the final product are seriously affected. Therefore, the stability of the silicone emulsion is very important.

In U.S. Pat. No. 4,853,474, the low-temperature resistance is improved with crosslinked silicone-polyether, but in this method, the crosslinking degree of the silicone polyether itself is difficult to be controlled, so the uniform stability of the emulsion cannot be ensured. In U.S. Pat. No. 5,451,692, alkyl silicone-polyether is applied in the preparation of W/O type emulsion, and the compatibility with the oil phase component is improved through the introduction of the alkyl group. In EP-A-163541, it is introduced in studying defoamers that, the preparation of the high-viscosity polysiloxane emulsion is difficult, the cost is very high, and the effect is poor.

Through a lot of experiments, the inventors of the present invention have found that, adding a low-molecular-weight polysiloxane into a high-viscosity silicone composition in dispersing the composition is benefit to the preparation of a stable emulsion.

SUMMARY OF THE INVENTION

The present invention is directed to a method for emulsifying a high-viscosity silicone composition, to solve the problem that the high-viscosity silicone composition is difficult to be emulsified and dispersed in water.

Technical Solution

The method for preparing a silicone composition emulsion of the present invention is a method of dispersing a high-viscosity silicone composition into water, characterized in that the components, low-molecular-weight polysiloxane and emulsifier, are added into the high-viscosity silicone composition, thus the problem that the high-viscosity silicone composition is difficult to be emulsified is well solved. The viscosity of the high-viscosity silicone used in the method is 100,000 m-1,000,000 Pa·s.

The low-molecular-weight polysiloxane has a molecular structure as follows:

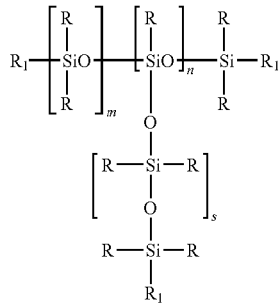

in which, m, n, and s are degrees of polymerization, m is an integer of 1-1,000, n is an integer of 1-500, and s is integer of 1-1,000. The values of m, n, and s ensure the viscosity of the low-molecular-weight polysiloxane of 50-3,000 mPa·s, and preferably 100-1,000 mPa·s.

R and $R_1$ are substituents. R is a linear or branched alkyl group having 1-20 carbon atoms, for example, methyl, ethyl, propyl, isopropyl, butyl, isobutyl, pentyl, isopentyl, tert-pentyl, octyl, isooctyl, sec-octyl, dodecyl, tetradecyl, hexadecyl, or octadecyl. In considering the cost and the availability of raw material, R is preferably methyl. $R_1$ is one of alkyl group, aminohydrocarbyl group, hydroxyl group, or halogen atom, in which the alkyl group is an alkyl group having 1-18 carbon atoms and can be the same as R or not. The halogen atom includes fluorine atom, chlorine atom, bromine atom, and iodine atom, and chloride atom is preferred. The aminohydrocarbyl group includes —$NH_2$, —$NHCH_2CH_2NH_2$, —$NHC_2H_4NHC_2H_4NH_2$, and —$OC_6H_4NH_2$. $R_1$ is preferably aminohydrocarbyl group, methyl, or hydroxyl.

The amount of the low-molecular-weight polysiloxane is 5-50 parts, and preferably 10-30 parts, based on 100 mass parts of the high-viscosity silicone composition.

The emulsifier is a surfactant, including anionic surfactant, cationic surfactant, and nonionic surfactant.

The nonionic surfactant includes, for example, polyoxyethylene nonylphenyl ether, polyoxyethylene octylphenyl ether, lauric acid polyoxyethylene ether, oleic acid polyoxyethylene ether, polyoxyethylene lauryl ether, polyoxyethylene cetyl ether, polyoxyethylene stearyl ether, sorbitan monolaurate, sorbitan monopalmitate, sorbitan monostearate, sorbitan monooleate, sorbitan tri stearate, sorbitan trioleate, polyoxyethylene sorbitan monolaurate, polyoxyethylene sorbitan monopalmitate, polyoxyethylene sorbitan monostearate, polyoxyethylene sorbitan monooleate, polyoxyethylene sorbitan tristearate, polyoxyethylene sorbitan trioleate, silicone-polyethers formed by polyoxyalkylene modified polysiloxane, and the like.

The anionic surfactant includes, for example, polyoxyethylene nonylphenyl ether sulfate, polyoxyethylene octylphenyl ether sulfate, alkyl phosphate, and the like.

The cationic surfactant includes, for example, alkylbenzyl ammonium salt, lauric acid imidazoline, oleoyl imidazoline, salt of hexadecyl amine, and the like.

The amphoteric surfactant includes, for example, alkyl trimethyl ammonium hexalactone type and phosphate type amphoteric surfactants.

The nonionic surfactant is preferred, and they can be used alone or in a mixture, and preferably in a mixture.

The total amount of the emulsifier is 40-150 parts, and preferably 60-110 parts, based on 100 mass parts of the high-viscosity silicone composition.

Depending on the requirements on the viscosity of the emulsion, a thickener can be added. The thickener includes, for example, polyacrylamide, carbomer, xanthan gum, polyacrylate, cellulose ethers. The amount of the thickener can be adjusted according to the viscosity of the emulsion. For long-term storage, a bactericide and a preservative are required to be added, such as, sodium hypochlorite, potassium sorbate, s-triazine, and kathon.

The method for preparing the emulsion includes "emulsifier in oil" method, "emulsifier in water" method, and "nascent soap" method. The inventors of the present invention use the "emulsifier in oil" method to prepare a water dispersed emulsion of the high-viscosity silicone composition, including:

mixing the high-viscosity silicone composition and low-molecular-weight polysiloxane under strong stirring for 5-60 min, and preferably for 20-40 min, to mix and infiltrate the high-viscosity silicone composition and low-molecular-weight polysiloxane fully each other; next, adding an emulsifier, and stirring for another 5-60 min, and preferably 15-45 min; then, raising the system temperature to 55-85° C., and while maintaining at this temperature, adding water slowly, and increasing the stirring speed to convert the W/O emulsion into an O/W emulsion, and further adding water to a desired mass concentration, generally 20-60%, and preferably 30-50%; further emulsifying the emulsion through a colloid mill; and finally, diluting the emulsion with water to a desired concentration.

The silicone composition emulsion prepared by the method contains a high-viscosity silicone composition and is characterized in that the emulsion further contains a low-molecular-weight polysiloxane and an emulsifier. The low-molecular-weight polysiloxane has a molecular structure as follows:

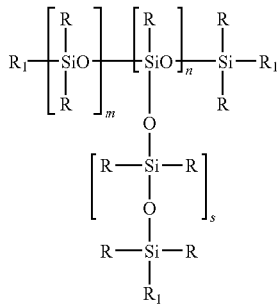

in which m, n, and s are degrees of polymerization, m is an integer of 1-1000, n is an integer of 1-500, and s is an integer of 1-1000; R is an alkyl group having 1-20 carbon atoms; $R_1$ is an alkyl having 1-18 carbon atoms, aminohydrocarbyl group, hydroxyl group, or halogen atom, in which the aminohydrocarbyl group is —$NH_2$, —$NHCH_2CH_2NH_2$, —$NHC_2H_4NHC_2H_4NH_2$, or —$OC_6H_4NH_2$. The amount of the low-molecular-weight polysiloxane is 5-50 parts, based on 100 parts of the high-viscosity silicone composition.

The emulsifier includes, for example, anionic surfactant, cationic surfactant, and nonionic surfactant. The amount of the emulsifier is 40-150 parts, based on 100 parts of the high-viscosity silicone composition.

The performance of the high-viscosity silicone composition emulsion prepared by the method of the present invention is evaluated mainly from the following aspects.

(1) Stability of the Water Dilution 1 part of the silicone emulsion is added into 99 parts of water and after it is dispersed uniformly, the liquid level of the water dilution is observed.

(2) High-Temperature Stability of the Water Dilution 1 part of the silicone emulsion is added into 99 parts of water, and after the temperature is raised, the liquid level of the water dilution is observed.

(3) Shear Resistance of the Emulsion

At normal temperature, the initial emulsion is placed on a horizontal oscillator and oscillated at an amplitude of 6 cm and a frequency of 100 times/min for 30 min, and then the liquid levels of the water dilutions are compared according to the method of (1).

(4) Defoaming and Anti-Foaming Performance of the Emulsion

A 0.5% aqueous solution of sodium dodecylbenzene-sulfonate is formulated as foaming solution, and 50 mL of the foaming solution is charged into a 100 mL shaking flask, and then 3‰ of the emulsion is added. The system temperature is raised to 60° C., and the flask is shaken 10 times to test the defoaming performance, and then is shaken 200 times to test the anti-foaming performance.

BRIEF DESCRIPTION OF THE DRAWINGS

No drawings

DETAILED DESCRIPTION OF THE INVENTION

Embodiment 1

The structure of the low-molecular-weight polysiloxane (LPS) is as follows.

LPS-1: R is $CH_3$, R1 is $CH_3$, s=10, m=50, n=10, and the viscosity of the polysiloxane is 70 mPa·s;

LPS-2: R is $CH_3$, R1 is OH, s=250, m=300, n=2, and the viscosity of the polysiloxane is 800 mPa·s;

LPS-3: R is $CH_3$, R1 is OH, s=10, m=30, n=2, and the viscosity of the polysiloxane is 50 mPa·s;

LPS-4: R is $CH_3$, R1 is $NH_2$, s=15, m=100, n=50, and the viscosity of the polysiloxane is 350 mPa·s.

Embodiment 2: Preparation of High-Viscosity Silicone Composition

By making reference to the preparation method of Example 1 in U.S. Pat. No. 4,639,489, a high-viscosity silicone composition was prepared. 378 g polydimethylsiloxane having a viscosity of 100,000 mPa·s, 180 g polysiloxane with hydroxyl groups at two ends having a viscosity of 10,000 mPa·s, and 18 g tetraethyl orthosilicate were fed into a reactor. The temperature was raised to 130-140° C., and then 3 g catalyst (preparation of the catalyst: reacting 90 g polydimethylsiloxane having a viscosity of 1,000 mPa·s with 10 g KOH at 120° C. for 15 min) was added. The mixture was stirred and heated continuously. Then, 30 g white carbon black having a specific surface area of 200 m²/g was added, and homogenized with a homogenizer. The reaction composition was heated to 180° C., maintained at this temperature for 4 hr, and then cooled to room temperature to get a viscous liquid, that is a high-viscosity silicone composition having a viscosity of 400,000 mPa·s.

Embodiment 3

50 parts of the high-viscosity silicone composition prepared in Embodiment 2 and 5 parts of LPS-1 were dispersed in a high-speed disperser for 20 min to be uniform, and then 15 parts of polyoxyethylene (10) octylphenyl ether, 10 parts of N-90 (polyoxypropylene ether modified polysiloxane, manufactured by Nanjing SIXIN Scientific-technological Application Research Institute Co., Ltd.) polyoxyethylene (3) nonylphenyl ether, 12 parts of sorbitan monostearate, and 8 parts of polyoxyethylene (20) sorbitan monostearate were added. The temperature was raised to 60° C. The mixture was stirred at a frequency of 50 Hz for 30 min to mix the silicone composition and the emulsifier uniformly. Next, 50 parts of water were added slowly, and the rotation speed was increased to 65 Hz in phase conversion, such that the W/O emulsion was fully converted into an O/W emulsion. Then, 50 parts of water were further added, at which the concentration of the crude emulsion was 50%. The crude emulsion was further emulsified with a homogenizer, till the particle size of the emulsion reached 10-30 μm. Thereafter, the temperature was decreased rapidly to normal temperature, and the emulsion was diluted with 800 parts of an acrylic acid-thickened aqueous solution to a concentration of 10%, and then 0.2% sodium hypochlorite was added as preservative. The performance evaluation is as shown in Table 1.

Embodiment 4

50 parts of the high-viscosity silicone composition prepared in Embodiment 2 and 8 parts of LPS-2 were dispersed in a high-speed disperser for 30 min, and then 10 parts of sorbitan monooleate, 12 parts of polyoxyethylene (20) sorbitan monooleate, 10 parts of N-90, and 10 parts of N-28 (polyoxyethylene ether modified polysiloxane, manufactured by Nanjing SIXIN Scientific-technological Application Research Institute Co., Ltd.) were added, and stirred at a frequency of 50 Hz for 35 min, to mix the silicone composition and the emulsifier uniformly. Next, the temperature of the mixture was raised to 75° C., 40 parts of water were added slowly, and the rotation speed was increased to 65 Hz in phase conversion, such that the W/O emulsion was converted into an O/W emulsion. Then, 60 parts of water were further added, at which the concentration of the crude emulsion was 50%. The crude emulsion was further emulsified with a homogenizer, till the particle size of the emulsion reached 10-30 μm. Thereafter, the temperature was decreased rapidly to normal temperature, and the emulsion was diluted with 800 parts of an acrylic acid-thickened aqueous solution to a concentration of 10%, and then 0.2% sodium hypochlorite was added as preservative. The performance evaluation is as shown in Table 1.

Embodiment 5

50 parts of the high-viscosity silicone composition prepared in Embodiment 2 were taken, into which 10 parts of LPS-3 were added, and dispersed in a high-speed disperser for 25 min. 15 parts of polyoxyethylene (10) octylphenyl ether, 10 parts of polyoxyethylene (3) octylphenyl ether, 12 parts of N-23 (polyoxyethylene polyoxypropylene ether modified polysiloxane, manufactured by Nanjing SIXIN Scientific-technological Application Research Institute Co., Ltd.), and 8 parts of N-28 were added and stirred at a frequency of 45 Hz for 35 min, to mix the silicone mixture and the emulsifier uniformly. Next, the system temperature was raised to 70° C., and 50 parts of water were added slowly, and the rotation speed was increased to 60 Hz in phase conversion, such that the W/O emulsion was converted into an O/W emulsion. Then, 50 parts of water were further added, at which the concentration of the crude emulsion was 50%. The crude emulsion was further emulsified with a homogenizer, till the particle size of the emulsion reached 10-30 μm. Thereafter, the temperature was decreased rapidly to normal temperature, and the emulsion was diluted with 800 parts of an acrylic acid-thickened aqueous solution to a concentration of 10%, and then 0.2% sodium hypochlorite was added as preservative. The performance evaluation is as shown in Table 1.

Embodiment 6

50 parts of the high-viscosity silicone composition prepared in Embodiment 2 were taken, into which 15 parts of LPS-4 were added, and dispersed in a high-speed disperser for 20 min. 5 parts of polyoxyethylene (10) octylphenyl ether, 3 parts of polyoxyethylene (3) octylphenyl ether, 12 parts of N-23, 6 parts of N-90, and 9 parts of N-28 were added, and stirred at a frequency of 50 Hz for 35 min, to mix the system to be uniformly. Next, the system temperature was raised to 65° C., 60 parts of water were added slowly, and the rotation speed was increased to 65 Hz in phase conversion, such that the W/O emulsion was converted into an O/W emulsion. Then, 40 parts of water were further added, at which the concentration of the crude emulsion was 50%. The crude emulsion was further emulsified with a homogenizer, till the particle size of the emulsion reached 10-30 μm. Thereafter, the temperature was decreased rapidly to normal temperature, and the emulsion was diluted with 800 parts of an acrylic acid-thickened aqueous solution to a concentration of 10%, and then 0.2% sodium hypochlorite was added as preservative. The performance evaluation is as shown in Table 1.

Comparative Example 1

50 parts of the high-viscosity silicone composition prepared in Embodiment 2 were taken, into which 15 parts of emulsifiers polyoxyethylene (10) octylphenyl ether, 15 parts of N-90 (polyoxypropylene ether modified polysiloxane, manufactured by Nanjing SIXIN Scientific-technological Application Research Institute Co., Ltd.) polyoxyethylene (3) nonylphenyl ether, 12 parts of sorbitan monostearate, and 8 parts of polyoxyethylene (20) sorbitan monostearate were added. The temperature was raised to 60° C. The mixture was stirred at a frequency of 50 Hz for 30 min to mix the silicone composition and the emulsifier uniformly. Next, 50 parts of water were added slowly, and the rotation speed was increased to 65 Hz in phase conversion, such that the W/O emulsion was converted into an O/W emulsion. Then, 50 parts of water were further added, at which the concentration of the crude emulsion was 50%. The crude emulsion was further emulsified with a homogenizer, till the particle size of the emulsion reached 10-30 μm. Thereafter, the temperature was decreased rapidly to normal temperature, and the emulsion was diluted with 800 parts of an acrylic acid-thickened aqueous solution to a concentration of 10%, and then 0.2% sodium hypochlorite was added as preservative. The performance evaluation is as shown in Table 1.

Comparative Example 2

50 parts of the high-viscosity silicone composition prepared in Embodiment 2 were taken, into which 10 parts of polyoxyethylene (10) octylphenyl ether, 8 parts of polyoxyethylene (3) octylphenyl ether, 12 parts of N-23, 11 parts of N-90, and 9 parts of N-28 were added. The mixture was stirred at a frequency of 50 Hz for 35 min to mix the system to be uniform. Next, the system temperature was raised to 65° C., 60 parts of water were added slowly, and the rotation speed was increased to 65 Hz in phase conversion, such that the W/O emulsion was converted into an O/W emulsion. Then, 40 parts of water were further added, at which the concentration of the crude emulsion was 50%. The crude emulsion was further emulsified with a homogenizer, till the particle size of the emulsion reached 10-30 μm. Thereafter, the temperature was decreased rapidly to normal temperature, and the emulsion was diluted with 800 parts of an acrylic acid-thickened aqueous solution to a concentration of 10%, and then 0.2% sodium hypochlorite was added as preservative. The performance evaluation is as shown in Table 1.

The stability and shearing resistance of the high-viscosity silicone composition dispersion can be significantly improved by adding the low-molecular-weight polysiloxane. By comparison, amino silicone oil has more contributions to the stability of the emulsion.

TABLE 1

Performance of the emulsion prepared by the method of the present invention

| Test Item | Embodiment 3 | Comparative Example 1 | Embodiment 4 | Embodiment 5 | Embodiment 6 | Comparative Example 2 |
|---|---|---|---|---|---|---|
| Stability of the Water Dilution | Thick oil-film on the water surface<br>A few floccus in the water | Floating oil on the water surface<br>Many floccus in the water | Thick oil-film on the water surface<br>A few floccus in the water | Thin oil-film on the water surface<br>Few floccus in the water | Thin oil-film on the water surface<br>Few floccus in the water | Thick oil-film on the water surface<br>Many floccus in the water |
| High-temperature Stability of the Water Dilution | No floating oil on the water surface at 50° C. | Floating oil on the water surface at normal temperature | No floating oil on the water surface at a temperature higher than 60° C. | No floating oil on the water surface at a temperature higher than 80° C. | No floating oil on the water surface at a temperature higher than 80° C. | Floating oil on the water surface at 30° C. |
| Shearing Resistance of the Emulsion | Thin oil-film on the water surface<br>Many floccus in the dilution | Floating oil on the water surface<br>Demulsified | Thin oil-film on the water surface<br>A few floccus in the dilution | Thin oil-film on the water surface<br>A few floccus in the dilution | Thin oil-film on the water surface<br>A few floccus in the dilution | Floating oil on the water surface<br>Demulsified |
| Defoaming Performance | 12" | 15" | 5" | 6" | 4" | 8" |
| Anti-foaming Performance | 39" | 30" | 25" | 20" | 15" | 18" |

What is claimed is:

1. A method for preparing a silicone composition emulsion, comprising:
   mixing a high-viscosity silicone composition and low-molecular-weight polysiloxane under strong stirring for 20-40 min, to mix and infiltrate the high-viscosity silicone composition and low-molecular-weight polysiloxane fully each other;
   adding an emulsifier, and stirring for 15-45 min;
   raising the temperature of the system to 55-85° C. and while maintaining at this temperature, adding water slowly, and increasing the stirring speed, such that the W/O emulsion is converted into an O/W emulsion, and a mass concentration of 20-60% is achieved initially;
   further emulsifying the emulsion through a colloid mill; and
   diluting with water to a desired concentration.

2. The method for preparing a silicone composition emulsion according to claim 1, wherein the low-molecular-weight polysiloxane has a viscosity of 50-3,000 mPa·s.

3. The method for preparing a silicone composition emulsion according to claim 1, wherein the low-molecular-weight polysiloxane has a molecular structure as follows:

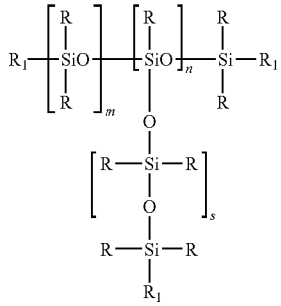

wherein m, n, and s are degrees of polymerization, m is an integer of 1-1000, n is an integer of 1-500, s is an integer of 1-1000; R is an alkyl group having 1-20 carbon atoms; $R_1$ is an alkyl group having 1-18 carbon atoms, aminohydrocarbyl group, hydroxyl group, or halogen atom, wherein the aminohydrocarbyl group is —NHCH$_2$CH$_2$NH$_2$, —NHC$_2$H$_4$NHC$_2$H$_4$NH$_2$, or —OC$_6$H$_4$NH$_2$; and the amount of the low-molecular-weight polysiloxane is 5-50 parts, based on 100 parts of the high-viscosity silicone composition.

4. The method for preparing a silicone composition emulsion according to claim 1, wherein the emulsifier is an anionic surfactant, a cationic surfactant, or a nonionic surfactant, and the amount of the emulsifier is 40-150 parts, based on 100 parts of the high-viscosity silicone composition.

5. The method for preparing a silicone composition emulsion according to claim 2, wherein the low-molecular-weight polysiloxane has a molecular structure as follows:

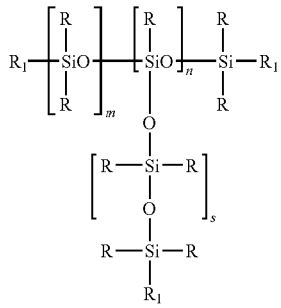

wherein m, n, and s are degrees of polymerization, m is an integer of 1-1000, n is an integer of 1-500, s is an integer of 1-1000; R is an alkyl group having 1-20 carbon atoms; $R_1$ is an alkyl group having 1-18 carbon atoms, aminohydrocarbyl group, hydroxyl group, or halogen atom, wherein the aminohydrocarbyl group is —NHCH$_2$CH$_2$NH$_2$, —NHC$_2$H$_4$NHC$_2$H$_4$NH$_2$, or —OC$_6$H$_4$NH$_2$; and the amount of the low-molecular-weight polysiloxane is 5-50 parts, based on 100 parts of the high-viscosity silicone composition.

* * * * *